July 8, 1941.　　　C. S. LAWTON　　　2,248,243
SUBMARINE APPARATUS
Filed Feb. 11, 1938　　　5 Sheets-Sheet 1
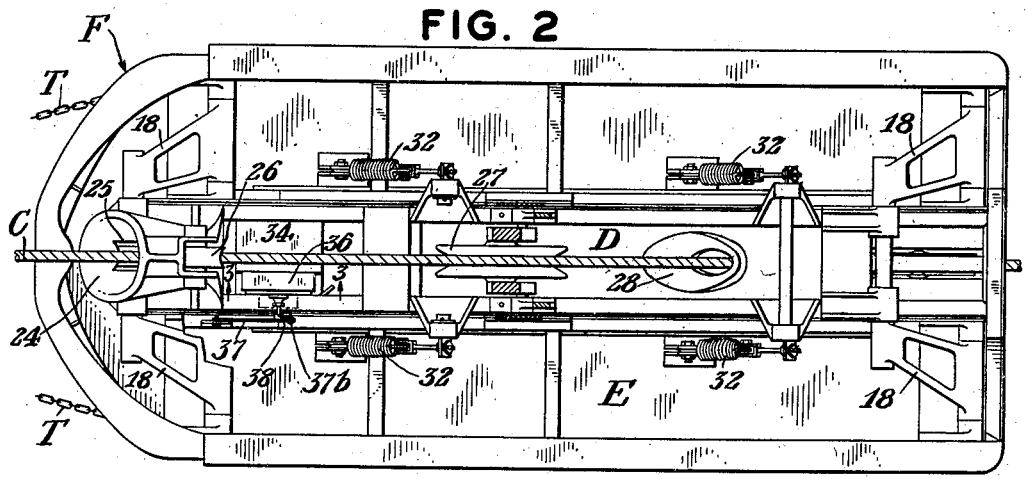
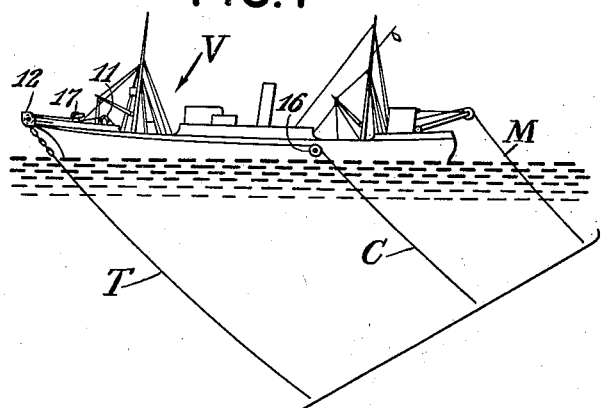
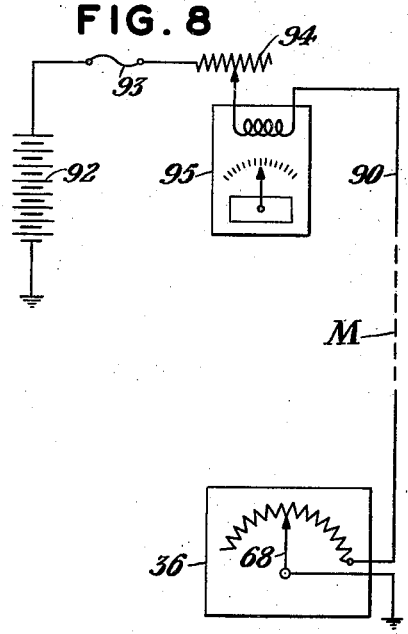
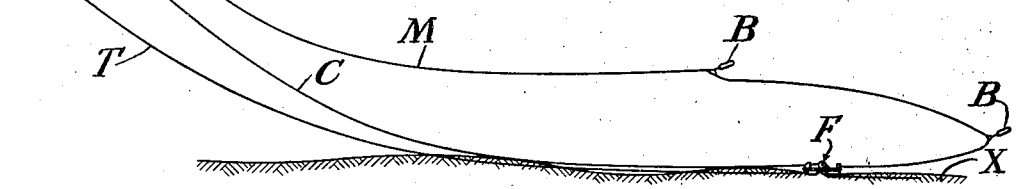
INVENTOR
C. S. LAWTON
BY　*J. F. Presson*
ATTORNEY July 8, 1941.  C. S. LAWTON  2,248,243
SUBMARINE APPARATUS
Filed Feb. 11, 1938   5 Sheets-Sheet 2
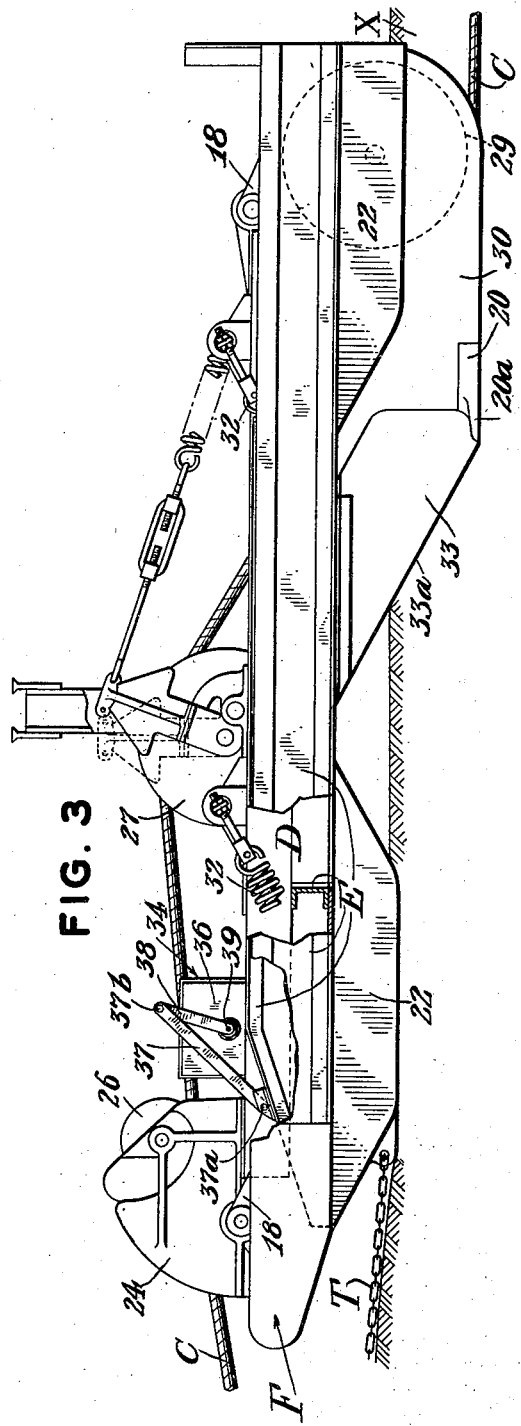
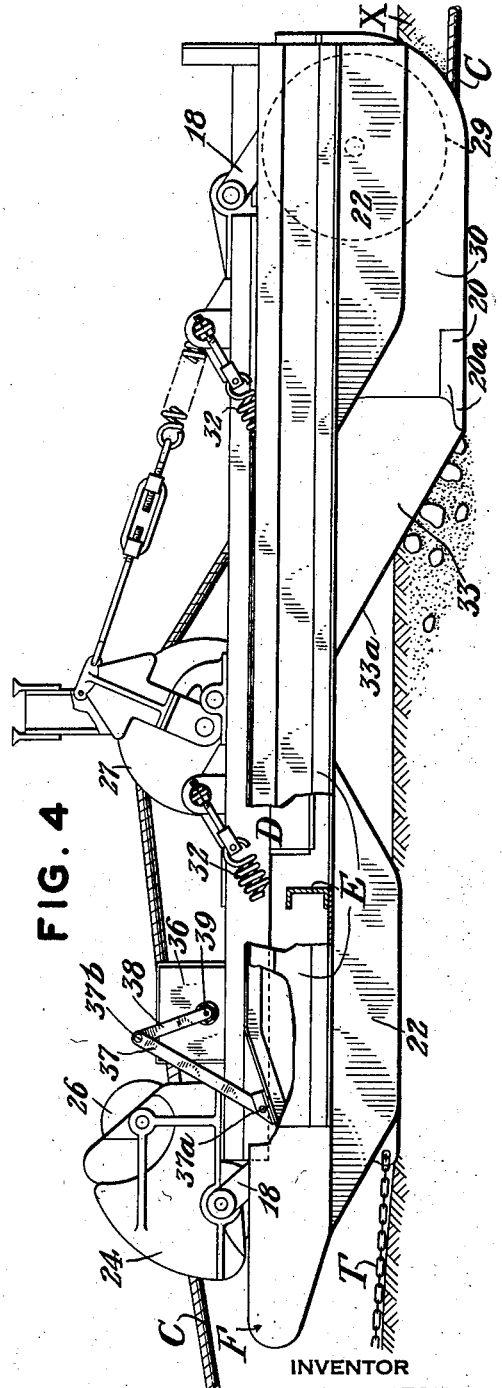
INVENTOR
C. S. LAWTON
BY *W. F. Presson*
ATTORNEY July 8, 1941.   C. S. LAWTON   2,248,243
SUBMARINE APPARATUS
Filed Feb. 11, 1938    5 Sheets-Sheet 3

INVENTOR
C. S. LAWTON
BY *W. F. Presson*
ATTORNEY

July 8, 1941.  C. S. LAWTON  2,248,243
SUBMARINE APPARATUS
Filed Feb. 11, 1938  5 Sheets-Sheet 4

INVENTOR
C. S. LAWTON
BY
ATTORNEY

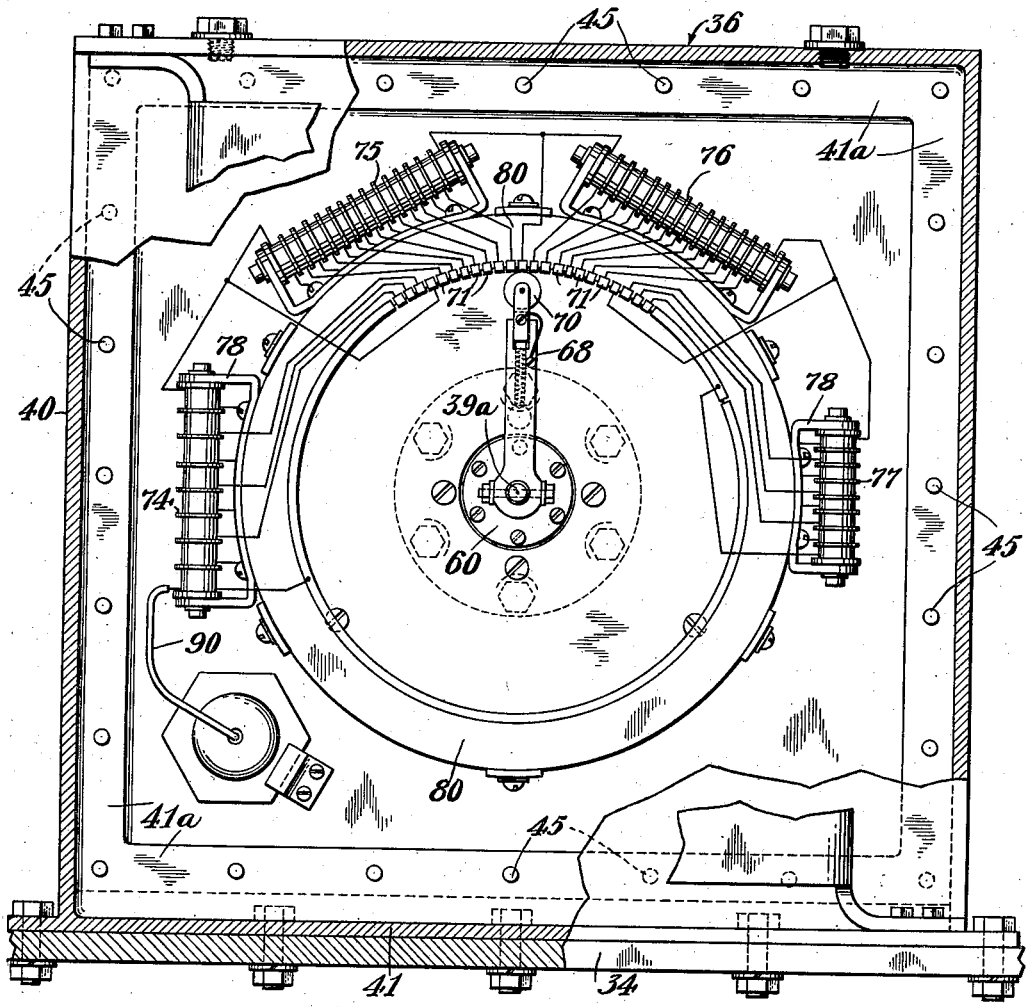

Patented July 8, 1941

2,248,243

UNITED STATES PATENT OFFICE 2,248,243

SUBMARINE APPARATUS

Chester S. Lawton, Ridgewood, N. J., assignor to The Western Union Telegraph Company, New York, N. Y., a corporation of New York Application February 11, 1938, Serial No. 189,972

9 Claims. (Cl. 61—72)

This invention relates generally to submarine apparatus especially adapted for use in deep water in which high hydrostatic pressures are encountered, and more particularly to submarine signalling apparatus for determining, or checking, at a point remote from a submarine cable laying device certain operations of said device as it travels along on the bed of the ocean during cable laying operations.

When submarine cables are laid on the bed of the ocean or other body of water through which they pass, they are frequently fouled or dragged and sometimes are broken by otterboards of nets of deep sea fishing vessels or by ships' anchors, and in the U. S. patent to C. S. Lawton, No. 2,099,527, issued November 16, 1937, there is disclosed a submarine cable plow adapted to be towed by a cable ship for forming under water a trench in the bed of the body of water in which the cable is to lie and simultaneously placing the cable therein to embed the same and thus avoid fouling of, or injury to, the cable, the trench thus formed being caused to vary in depth in accordance with the ground resistance offered to the passage of the plow, or in accordance with the towing tension, the advantages of which are set forth in detail in the patent. It is highly desirable to know on board ship the depth of the trench formed at any instant by the cable plow, thereby to obtain an indication of the manner in which the plow is working and to determine the approximate depth to which the cable is being buried.

One of the objects of the invention is to provide submarine apparatus suitable for operation in deep water in which high hydrostatic pressures are encountered, said apparatus having suitable means for neutralizing the hydrostatic pressure of the water.

A further object is a submarine device enclosed in a casing which normally is insufficient to withstand the high hydrostatic pressures encountered in deep water, having suitable means for neutralizing or counteracting the hydrostatic pressures on the outside of the casing and for preventing the entrance of water into the casing, particularly at the place where an operating element for the submarine device passes through the casing.

Another object is a submarine device having signal transmitting means suitable for operation in deep water, which will disclose on board ship, or at some other distant point, certain operations of the device as it travels along on the bed of the body of water.

Another object is transmitting apparatus adapted to be carried by a cable embedding device which plows a cable trench of varying depth, for automatically transmitting signals to indicate on board ship the depth of the trench at all times during the plowing operation, which apparatus will operate equally well in shallow and deep water.

The invention further resides in the features of combination, construction and arrangement hereinafter described and claimed.

For an understanding of the invention, and for illustration of one of the various forms it may take, reference is had to the accompanying drawings, in which:

Figure 1 is a diagrammatic view of a cable ship and submarine cable plow embodying signal transmitting apparatus in accordance with the invention, during cable laying operations;

Fig. 2 is a plan view of the submarine cable plow and transmitting apparatus;

Fig. 3 is a side view, in elevation, of the device of Fig. 2 showing the position of certain parts thereof when plowing a trench in an area of the ocean bed in which the ground resistance is comparatively low;

Fig. 4 is a view similar to Fig. 3, showing the position of certain parts of the device when plowing a trench in an area of dense material;

Fig. 7 is a sectional view taken along the line 7—7 of Fig. 6;

Fig. 8 is a schematic diagram of the signal circuit employed in Fig. 1.

Figure 5:
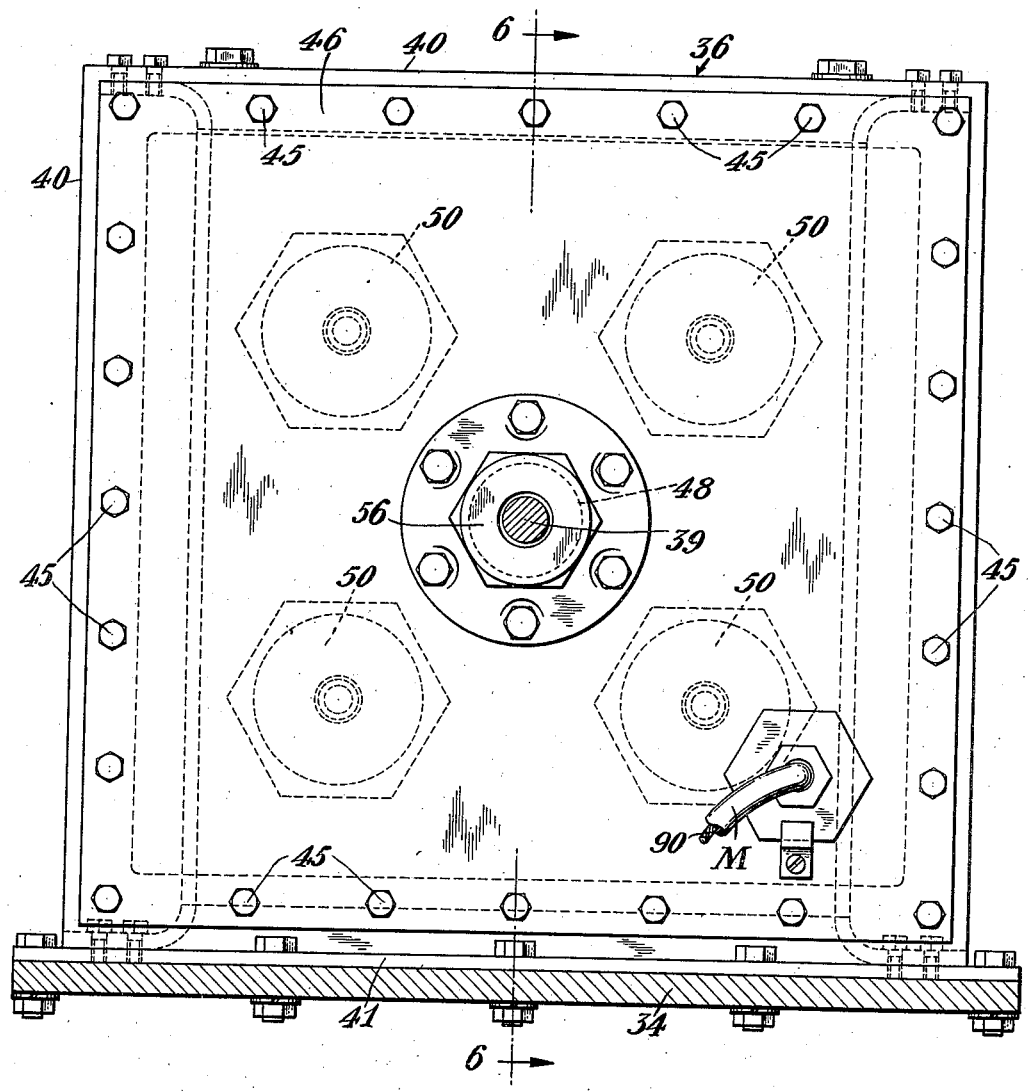
Fig. 5 is a view, in elevation, of the signal transmitter employed.

Referring to Fig. 1 of the drawings, there is shown a cable embedding device F for forming a cable trench X in the bed the the body of water in which the cable C is to be embedded and simultaneously placing the cable in the trench. As will be seen from the figure, the cable embedding device is towed by a cable ship or vessel V, by means of a towline T, both the cable and towline forming long curves in the water, the amount of sag in the cable and towline varying with the depth of the water in which the embedding device is working. By employing a towline of proper length, the sag in the line causes the latter to exert a pull on the cable embedding device in a direction substantially parallel to the bed on which the embedding device is traveling. Preferably, the degree of curvature in the cable C is maintained such that the cable is approximately tangent to the bed at or near the point where it enters the embedding device. The cable is payed out from a cable supply in the hold of the vessel V, preferably in the manner disclosed in the U. S. Lawton and Bloomer Patent No. 2,067,717, issued January 12, 1937, the cable passing through a suitable brake device which controls the slack condition of the cable as it passes to the cable payout drum 11. The cable winds around the drum several times and then passes to a roller or sheave 12 on the bow of the ship, after which it is passed along the side of the ship a suitable distance, for example, two-thirds the length of the ship, to a roller or sheave 16 on the side of the cable ship, thereby to minimize the possibility of fouling of the cable C with the towline T. The cable also passes through a dynamometer device 17 which measures the tensile strength on the cable as the latter is payed out. It will be understood that additional rollers or sheaves, not shown, are provided for supporting and guiding the cable on board ship, and also that additional cable sheaves may be provided on the side of the ship, if desired.

The stress on the towline T may be measured and controlled by a suitable dynamometer device similar to that employed in measuring the stress on the cable C, and the length of the towline between the bow of the vessel and the cable embedding device F may be adjusted to varying depths of water and conditions of towing in the manner disclosed in the aforesaid Lawton and Bloomer patent.

The cable embedding device may be of the type disclosed in the Lawton and Bloomer patent, but preferably is in accordance with the improved form of cable plow disclosed in the aforesaid Lawton Patent No. 2,099,527. Briefly, the latter device comprises two frame members or platforms, generally indicated at D and E, respectively, Figs. 2, 3 and 4 herein, operatively connected together by forward and after link arms 18, which coact to cause a plowshare 20, Figs. 3 and 4, to form a cable trench X that varies in depth as the ground resistance of the bed varies, thereby to maintain the towline tension within predetermined limits and to cause the cable to be embedded to a greater depth in those areas of the ocean bed comprising soft material than in the areas comprising denser material. Preferably, and as shown, the plowshare has wing members 20a on either side thereof to facilitate displacing the material forming the bed sufficiently to enable the cable to be laid in the bottom of the resulting trench. Rigidly secured to the frame member E are runners or skids 22 by means of which the cable embedding device is slid along on the bottom of the ocean.

The frame member D carries a forward cable guide member 24 which permits the cable C easily to enter the guide and pass between the sheaves or rollers 25 and 26, over the roller 27, and through a trunkway 28, Fig. 2, the cable being forcibly laid in the bottom of the trench X by means of a sheave or cable guide roller 29, the cable passing between two side plates 30 in order that the material displaced by the plow will not slide or be washed back into the trench before the cable is laid therein. As set forth in detail in the aforesaid Lawton patent, the platform D in its lowermost position rests on the platform E, and retractile tension springs 32, operatively connected to the platforms, are provided to oppose their separation. The plowshare 20 is rigidly secured to and depends from the platform D which is vertically movable with respect to platform E. When the ground resistance offered to the passage of the plowshare 20 builds up, a couple is created with the towing tension, tending to separate the two platforms D and E vertically. This causes the upper platform D to rise to different heights depending upon the density of the material forming the bed, and this causes a corresponding rise in the plowshare 20 carried by the platform D, thus decreasing the depth of the trench X as the dense material is encountered and causing the trench to vary in depth inversely as the density of the material forming the surface of the bed of the body of water. Resisting the couple thus formed is the weight of the upper platform D and the tension exerted by the springs 32, and by proper design of the spring structure a balance can be obtained at any predetermined maximum towing tension at both extreme positions of the frames.

In order to prevent fouling of the plowshare 20 by obstructions, such as underlying rock formations and the like, which may be encountered in the ocean bed, a web portion 33, Fig. 3, is provided which extends between the plowshare and the platform D, the inclined forward edge 33a of which web engages any such obstruction in advance of the plowshare and causes the latter to be lifted up over the obstruction. After the obstruction has been passed, the device immediately begins again to plow the cable trench and continues with the embedding operation of the cable, and thus operations need not be suspended because of any obstruction encountered.

Fixedly secured to plate 34, Fig. 2, of the platform D is a transmitting device 36 constructed in accordance with the present invention, this device being operable under water and adapted to transmit signals corresponding to the degree of separation of the platforms D and E, and thus give an indication on board ship of the depth of the cable trench being formed by the cable embedding device as it travels along on the bed of the body of water. In the embodiment illustrated herein, the electrical signals produced by this device are transmitted, by means of the signal or messenger cable M, Fig. 1, to the cable ship, the ship having receiving apparatus thereon responsive to the signals for indicating, and preferably recording, the degree of separation of the platforms at any instance during the cable laying operations.

The transmitter is controlled by means of links 37 and 38, Figs. 2, 3 and 4. Link 37 is pivotally connected at one end 37a to the frame structure of platform E and at its other end 37b is pivotally connected to one end of the link 38. The other end of link 38 is secured to a rotatable shaft 39 which extends through the casing of the transmitter to operate the same in the manner hereinafter set forth. In Fig. 3 the plow is passing through relatively soft material and therefore the plowshare 20 is in approximately its lowermost position, and in this position forms a relatively deep trench. When the plow is passing through denser material, however, the platforms D and E are separated by reason of the increase in ground resistance, and the plow 20 is raised upwardly by the rise of the platform D to the position shown in Fig. 4. In the latter position, it will be seen that the link structure 37, 38 has rotated the transmitter shaft 39, in a counterclockwise direction as viewed in the figure, to a position corresponding to that of the plowshare, and in passing from the position shown in Fig. 3 to the position shown in Fig. 4, signals are produced by the transmitter 36 to indicate this fact on board ship.

Figure 6:
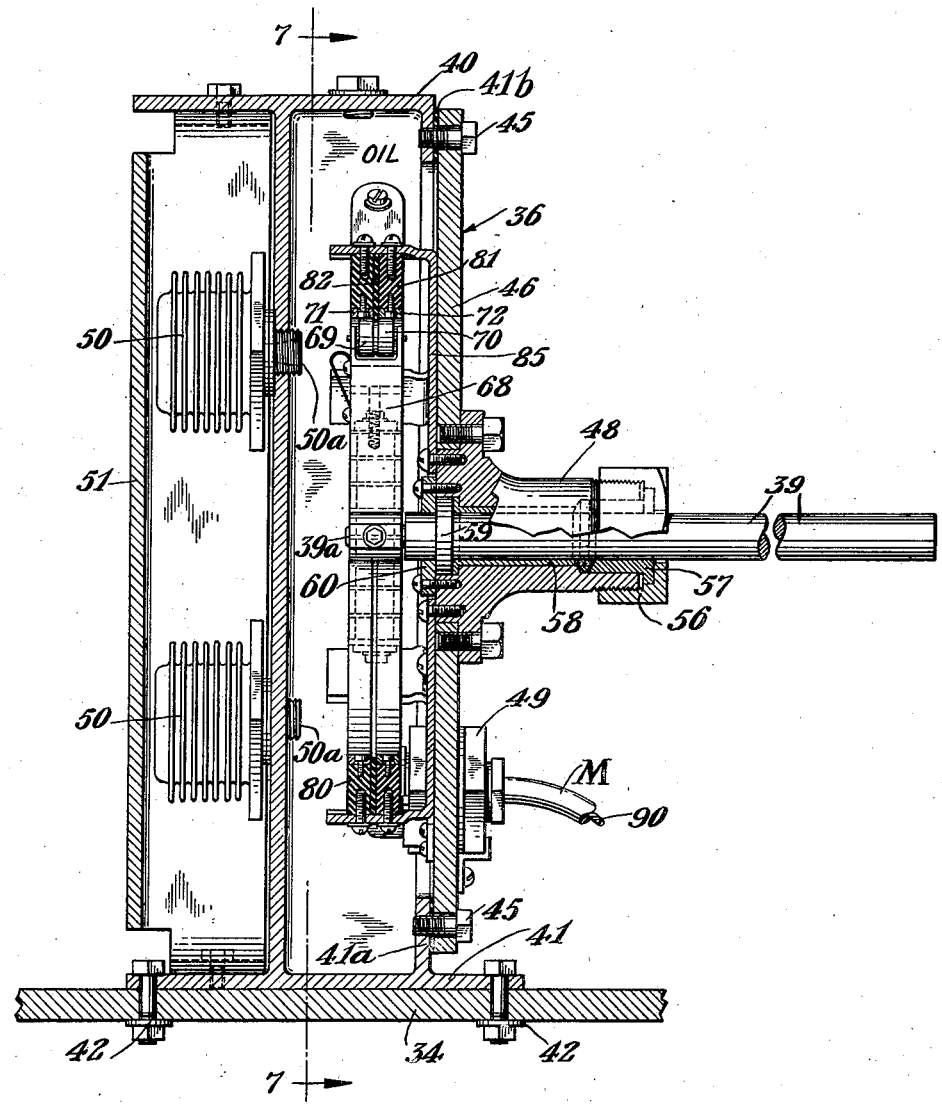
Fig. 6 is a sectional view taken along the line 6—6 of Fig. 5.

Figs. 5 to 7 illustrate the various details of a preferred form of transmitting device, although any other suitable transmitting device may be employed. In the embodiment illustrated, the transmitter is enclosed in a casing 40, which is filled with an insulating oil as indicated in Fig. 6, preferably castor oil of low acid content. The casing has a lower flanged portion 41 for receiving bolts 42, by means of which the transmitter casing is secured to the plate 34 of the platform D of the embedding device. The casing is also provided with a flanged portion 41a for receiving bolts 45, which clamp a detachable cover plate 46 on the casing, with a gasket 41b therebetween.

Because of the enormous hydrostatic pressures encountered in deep sea operations, the casing 40 for the transmitter must be able to withstand very high pressures. The use of a very heavy container having the proper configuration, for example, cylindrical or spherical, does not solve the problem where a cable or conductor, such as the signal cable M, or where a shaft 39, or other operating member, enters the casing, since the hydrostatic pressure of the water will cause the casing to leak at the gland structure 56, 57, and packing in the stuffing box 48, Fig. 6, around the shaft 39, providing the necessary freedom of movement of the shaft is present, notwithstanding various methods heretofore devised in an effort to prevent this. Also, the casing tends to leak around the gland and packing of the stuffing box 49 where the cable M enters. Furthermore, the use of a very heavy casing is undesirable because of the considerable additional weight of such casings, and also because the configuration of such casings usually results in considerable lost space between the enclosed apparatus and the casing.

In accordance with the present invention, bellows structure or equivalent, illustrated by the metal bellows members 50, is employed, the bellows structure being in communication with the interior of the casing 40. In the specific embodiment shown, the members 50 have their inner open ends 50a tightly screwed into the body of the casing from the outside, the outer bellows portions projecting from a side of the casing as shown in Fig. 6. The bellows preferably are protected by a false side 51 of steel plate, the plate being fitted to the container with sufficient clearance to permit the water to reach the bellows. The casing and bellows are filled with oil, and as hydrostatic pressure of the water is applied to the bellows, the latter are compressed to an extent such that the pressure on the oil within the casing, due to the compression of the bellows, increases sufficiently to oppose and counteract the hydrostatic pressure of the water, thus preventing collapse of the casing and preventing the entrance of water through the stuffing boxes 48 and 49. In a submarine device such as illustrated herein, the bellows are so constructed that at a depth of 500 fathoms in sea water all bellows members will be compressed about ¾ of the maximum permissible amount. In filling the casing with oil, it is necessary to take precautions against leaving air pockets.

By means of the equalization of pressure within and without the casing in the manner disclosed, the casing may be made of relatively thin, light weight material, and at a comparatively low cost, and may have any desired configuration. Furthermore, the pressure on the oil or other fluid within the bellows structure and casing will automatically increase or decrease as the hydrostatic pressure of the water on the outside of the casing increases or decreases, and only sufficient pressure is built up within the casing necessary to counteract the outside pressure regardless of the depth of the water in which the device is working, and therefore no undue stresses are imposed on the casing or the device within. The invention is particularly applicable to transmitters, motors and other electrical devices for operation in deep water, but it will be appreciated that it is also applicable to many other types of submarine devices for various purposes in which latter case the casing and bellows structure may be filled with any suitable liquid or substantially incompressible fluid medium, which may be either conducting or non-conducting in an electrical sense, depending upon the nature of the device or apparatus within the casing and the purpose for which it is used.

Referring again to Fig. 6, the operating shaft 39 is provided with a bearing 58, and an enlarged portion 59 on the shaft coacts with the inner end of the bearing 58 and a plate 60 to prevent undue end play of the shaft. The inner reduced end portion 39a of the shaft 39 has bolted thereto the inner end of a rheostat arm 68, the arm carrying at its outer end phosphor-bronze spring-pressed rollers 69 and 70 adapted to travel over and make electrical contact with two rows of conducting segments 71 and 72 respectively, for connecting in circuit various sections of the tapped resistance coils 74, 75, 76 and 77, Fig. 7. The rheostat segments are secured to the inner surfaces of two annular rings 80 and 81 of Bakelite or other suitable insulating material, these rings being clamped together with an insulating separator ring 82, the separator ring insuring proper spacing between the two rows of contacts 71 and 72. The resistance coils 74 to 77 are secured by brackets 78 to the outer surfaces of the annular rings, and the rings are supported by a spider framework 85 secured to the cover plate 46. By means of this construction all working parts other than the bellows are supported by the cover plate 46, and this maintains correct tracking of the rollers 69 and 70 of the rheostat arm on the rows of contacts at all times, and also facilitates inspection and repair of the various parts.

Any turning movement of the shaft 39, caused by a change in the amount of separation of the platforms D and E of the submarine device as it travels along on the bed of the ocean causes a corresponding movement of the rheostat arm 68 and the rollers 69 and 70 over the contact segments 71 and 72, and thus electrical impulses are introduced into the signal circuit 90, Fig. 8, for transmitting to the vessel V electrical signals corresponding to the degree of separation of the platforms at any instant, which signals produce aboard ship a movement of a recording milliammeter 95, the latter indicating and also producing a record of the successive positions of the platforms D and E relative to each other, and thus indicate at any instant the depth of the cable trench formed during the cable laying and embedding operations. Any other suitable receiving device may, of course, be employed.

In the device disclosed herein the particular design of the transmitter rheostat shown was chosen for the following reasons. It was desirable that the shaft 39 and the rheostat arm 68 register one and one-half degree angular movements in the region of the predetermined normal position shown on Fig. 7, and a stud type rheostat was desirable. The radius of the arc of contact had to be large for one and one-half degree studs to be practicable; on the other hand, a large radius involves a high friction torque and a large casing. Step-up gearing between the rheostat arm and its actuating shaft 39 was impracticable because of the effect which even a slight backlash and friction would have on the accuracy of the device. Since the normal pressure at the contact surfaces was to reach 1300 pounds per square inch, the coefficient of friction had to be as small as possible so that the desired accuracy could be obtained with a reasonable value of torque required. In the rheostat herein disclosed, the contact is made by the rollers 69 and 70 which move over the two rows of segments 71 and 72. The smallest segments of each row (which are on each side of the normal position as shown in Fig. 7) subtend an angle of three degrees at the shaft axis, and one row of segments is displaced with respect to the other. The rollers 69 and 70 alternately make contact with the segments of the two rows, and the effect is that of segments on one and one-half degree centers, while the radius of the contact circle is only approximately four inches in the embodiment illustrated. Preferably and as shown, the transmitter is arranged to give readings in steps of one and one-half degrees for fifteen degrees swing of the rheostat arm on either side of normal position, but beyond this the rheostat segments and the corresponding milliammeter deflections are enlarged.

The signaling circuit 90, shown diagrammatically on Fig. 8, is energized by a 110 volt battery or other source of direct current 92 on board ship, one side of the battery being grounded to the ship's hull and the other side connected through a fuse 93, and a ballast resistance 94 to the recording milliammeter 95. From the milliammeter the circuit continues through the conductor 90 and signal cable M, shown in Fig. 1, and at the plow the signal cable is secured in any suitable manner to the plow structure, and the cable lead or conductor 90 enters the transmitter 36 through the stuffing box 49 in the cover 46 of the transmitter casing hereinbefore described. The conductor 90 comprising the signal circuit is connected, as shown in Fig. 7, to one end of the resistance element 74, and thence through the various sections of the resistance coils 74 to 77 to the rheostat segments 71 and 72. The return circuit is through the spring-pressed rollers 69 and 70, rheostat arm 68, and thence to the casing 40, the circuit being completed through the water to the vessel V to which the battery 92 is grounded.

The ballast resistance 94, Fig. 8, on board the vessel preferably is of the tubular type and is continuously variable from zero to the necessary value, for example, 276 ohms, the resistance being provided to adjust the milliammeter deflection at the commencement of an operation and subsequently protecting the milliammeter in the event of a cable fault. The deflection adjustment should be made when the transmitter on the plow is in a known position, for instance, with the rheostat arm 68 in the mid-point position, to bring the milliammeter pointer to the corresponding mid-point scale position. Once set, the ballast resistance should remain unchanged until the length of messenger cable M in the signal circuit is changed. In the specific circuit disclosed in Fig. 8 of the drawings, the resistance in circuit between the ship's ground and the plow, including the resistance of the messenger cable but excluding the plow instrument, will be approximately 229 ohms. Since the messenger cable shown has a resistance of approximately 49 ohms per mile, there will be between 130 and 230 ohms in the ballast resistance, depending on the length of messenger cable in use. It will be appreciated, however, that the constants employed may vary within wide limits, depending upon various factors, such as the particular type of signal transmitter employed, the depth at which the submarine device is working, etc.

The recording milliammeter is of a type well known in the art, and therefore is not described here in detail. The useful part of the chart on the recording milliammeter may be 3¾ inches wide, and is divided into 50 parts each representing 10 milliamperes of current. The divisions are progressively smaller from the zero-current end of the scale to the maximum-current end, but the departure from linearity is slight. The indicator circuit has been so designed that the current will not fall below 20 milliamperes or rise above 480 milliamperes, unless a fault occurs in the messenger cable or elsewhere.

It is essential that the supply of voltage 92 be maintained within a small margin on either side of 110 volts. The effect of a change of voltage on the milliammeter deflection varies with the deflection itself, and the apparatus has been so designed that the greatest effect occurs in lesser-used parts of the scale or where the degree of accuracy required is lowest.

In order to prevent fouling of the cable M by the plough or the cable C or towline T, buoy devices B are provided, as shown in Fig. 1, the buoy devices being connected to the cable at points so spaced from the cable laying device as to prevent fouling. Preferably, although not necessarily, the buoy devices are of the type disclosed and claimed in my copending application for "System and apparatus for determining at a distance the angular position of a submarine device," filed of even date herewith, in which each buoy device B comprises a plurality of small buoys or hollow steel balls, these small buoys being enclosed in a container of canvas or other suitable material. The small buoys are better adapted to withstand the enormous hydrostatic pressures encountered and yet retain a reasonable margin of buoyancy. Even when relatively small balls were used as buoys, nevertheless it was found these were likely to collapse in the event of a dent in them by adjacent balls, and therefore the individual buoys in each of the devices B are separated by shock absorbing means of felt or other suitable material. With the buoy device shown, eddy resistance and consequent vibrational stresses are reduced to a minimum and are not substantially greater than that encountered with a single ball.

The cable embedding device F may be lowered onto the bed of the ocean or other body of water by any suitable form of lowering line, such as shown in the aforesaid Lawton and Bloomer Patent No. 2,067,717 or the Lawton Patent No. 2,099,527. Because of the disposition of the center of gravity which is kept low in the device F and because of the substantial breadth of the device, the device will not turn over even though canted through a large angle with respect to the horizontal, and if the device should be canted on to its side its configuration and its low center of gravity tend to cause it to return to working position. The device is especially adapted for embedding a submarine cable in deep water and at considerable distances from shore, and may be lowered into working position out at sea in such areas. The various mechanical elements of the apparatus disclosed preferably are made from material resistant to the corrosive action of salt water.

In the specific embodiment disclosed, the device F, on which the transmitting unit 36 is mounted, is employed for embedding a submarine cable, but, as hereinbefore stated, the invention is not limited to such a device, but may be utilized in various kinds of submarine apparatus and devices. Many other and varied forms and uses will readily suggest themselves to those versed in the art without departing from the invention, and the invention is, therefore, not limited except as indicated by the scope of the appended claims.

I claim:

1. In submarine apparatus comprising a device enclosed in a casing for operation under water in the ocean or other body of deep water, and in which the casing itself is insufficient to withstand the hydrostatic pressures encountered when operating in deep water; means for automatically counteracting the hydrostatic pressure of the water on the outside of the casing, said means comprising bellows structure in communication with the interior of the casing with a wall portion of the bellows structure subject to the hydrostatic pressure of the water, said casing and bellows structure being filled with a substantially incompressible fluid, said bellows structure being collapsible by the hydrostatic pressure of the water to an extent sufficient to increase the pressure on the fluid in the casing and cause the fluid to substantially neutralize the hydrostatic pressure of the water on the casing, said casing and bellows structure being sealed so as to cause the amount of fluid contained therein to remain constant irrespective of the extent to which the bellows structure is collapsed due to the pressure exerted thereon by the water on the outside of the casing said bellows structure in operation being collapsible solely by the hydrostatic pressure of the water in which said device is working.

2. In submarine apparatus comprising a device enclosed in a casing for operation under water in the ocean or other body of deep water, having a member passing through said casing and operatively connected to said device, and in which the casing itself is insufficient to withstand the hydrostatic pressures encountered when operating in deep water; means for preventing collapse of the casing due to the hydrostatic pressures encountered and for preventing leakage of water into the casing at the place where said member passes through the casing, said means comprising bellows structure in communication with the interior of the casing with a wall portion of the bellows structure subject to the hydrostatic pressure of the water, said casing and bellows structure being filled with a substantially incompressible fluid, said bellows structure being collapsible by the hydrostatic pressure of the water to an extent sufficient to increase the pressure on the fluid in the casing and cause the fluid to counteract the hydrostatic pressure of the water on the outside of the casing and at the place where said member passes through the casing, said casing and bellows structure being sealed so as to cause the amount of fluid contained therein to remain constant irrespective of the extent to which the bellows structure is collapsed due to the pressure exerted thereon by the water on the outside of the casing said bellows structure in operation being collapsible solely by the hydrostatic pressure of the water in which said device is working.

3. In submarine apparatus comprising an electrical device enclosed in a casing for operation under water in the ocean or other body of deep water, having a member passing through a wall of said casing and operatively connected to said device, said member being movable relative to the wall of the casing at the place where the member passes through the wall, and in which the casing itself is insufficient to withstand the hydrostatic pressures encountered when operating in deep water; means for preventing collapse of the casing due to the hydrostatic pressures encountered and for preventing leakage of water into the casing at the place where said member passes through the casing, said means comprising bellows structure in communication with the interior of the casing with a wall portion of the bellows structure subject to the hydrostatic pressure of the water, said casing and bellows structure being substantially filled with an insulating oil, said bellows structure being collapsible by the hydrostatic pressure of the water to an extent sufficient to increase the pressure on the oil in the casing and cause the oil to counteract the hydrostatic pressure of the water on the outside of the casing and at the place where said member passes through the casing, said casing and bellows structure being sealed so as to cause the amount of oil contained therein to remain constant irrespective of the extent to which the bellows structure is collapsed due to the pressure exerted thereon by the water on the outside of the casing said bellows structure in operation being collapsible solely by the hydrostatic pressure of the water in which said device is working.

4. In submarine apparatus comprising a device enclosed in a casing for operation under water in the ocean or other body of deep water, having a member passing through said casing and operatively connected to said device, and in which the casing itself is insufficient to withstand the hydrostatic pressures encountered when operating in deep water; means for preventing collapse of the casing due to the hydrostatic pressures encountered and for preventing leakage of water into the casing at the place where said member passes through the casing, said means comprising bellows structure in communication with the interior of the casing and an outer wall portion of the bellows structure subject to the hydrostatic pressure of the water, said casing and bellows structure being filled with a substantially incompressible fluid, said bellows structure being collapsible by the hydrostatic pressure of the water to an extent sufficient to increase the pressure on the fluid in the casing and cause the fluid to counteract the hydrostatic pressure of the water on the outside of the casing, said casing and bellows structure being sealed so as to cause the amount of fluid contained therein to remain constant irrespective of the extent to which the bellows structure is collapsed due to the pressure exerted thereon by the water on the outside of the casing said bellows structure in operation being collapsible solely by the hydrostatic pressure of the water in which said device is working.

5. A submarine cable embedding device comprising trench forming means for forming under water a trench in the bed of the body of water in which the cable is to lie, said device having supporting means for travelling along on the bed of said body of water, means operable in accordance with the ground resistance offered to the passage of said trench forming means through the bed for adjusting the position of the trench forming means relative to the supporting means to vary the depth of the trench as said ground resistance varies, said device having means operable under the water for transmitting signals corresponding to different positions assumed by the trench forming means relative to the supporting means, and receiving means located at a distance from the transmitting means and responsive to said signals to indicate the various positions of the trench forming means.

6. A submarine cable embedding device comprising trench forming means for forming under water a trench in the bed of the body of water in which the cable is to lie, means on said device to enable the same to travel along on the bed of said body of water, means for towing the device along on said bed, means operable in accordance with the towing tension for vertically adjusting the position of the trench forming means to vary the depth of the trench as the towing device varies, said device also having means operable under the water for transmitting signals in accordance with the vertical positions assumed by the trench forming means as the towing tension varies, and receiving means located at a distance from the transmitting means and responsive to said signals to indicate the various vertical positions of the trench forming means.

7. A submarine cable embedding device comprising a first frame member, a second frame member having a plowshare for plowing a cable trench in the bed of the body of water in which the cable is to lie, means interconnecting said frame members for enabling relating vertical movement between them, said first frame member having means for engaging and traveling along on the bed of the body of water, means controlled by the ground resistance offered to the passage to said plowshare for vertically moving said second frame member relative to the first frame member for automatically adjusting the position of the plowshare to vary the depth of the trench as said ground resistance varies, said device having means operable under the water for transmitting signals in accordance with the extent of vertical movement of said second frame member relative to the first frame member, and receiving means located at a distance from the transmitting means and responsive to said signals to indicate the relative movement between the frame members.

8. A submarine cable embedding device comprising a first frame member and a second frame member and means interconnecting said frame members responsive to a couple set up therein, means urging one of said frame members towards the other, said first frame member having means for engaging and traveling along on the bed of the body of water in which the cable is to lie, said second frame member having a device for forming a cable trench in said bed, and means operable by the ground resistance offered to the passage of the trench-forming device for vertically moving said second frame member away from the first frame member, against the action of said means urging one of the frame members towards the other, for adjusting the position of the trench-forming device to decrease the depth of the trench as said ground resistance increases, said embedding device having means operable under the water for transmitting signals corresponding to the degree of separation of said frame members, and receiving means located at a distance from the transmitting means and responsive to said signals to indicate the varying degree of separation of the frame members.

9. A submarine cable embedding device comprising trench forming means for forming under water a trench in the bed of the body of water in which the cable is to lie, said device having supporting means for travelling along on the bed of said body of water, said device having means movable to different operative positions depending upon the depth of the trench being formed and means operable under the water controlled by said movable means for transmitting signals corresponding to the depth of the trench being formed, and receiving means located at a distance from the transmitting means and responsive to said signals for indicating the depth of the trench being formed during the embedding operation.

CHESTER S. LAWTON.